(12) United States Patent
Fischer

(10) Patent No.: US 10,178,281 B2
(45) Date of Patent: Jan. 8, 2019

(54) SYSTEM AND METHOD FOR SYNCHRONIZING AUDIO AND VIDEO SIGNALS FOR A LISTENING SYSTEM

(71) Applicant: Starkey Laboratories, Inc., Eden Prairie, MN (US)

(72) Inventor: Brian Fischer, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 14/444,753

(22) Filed: Jul. 28, 2014

(65) Prior Publication Data

US 2016/0028925 A1 Jan. 28, 2016

(51) Int. Cl.
| | |
|---|---|
| H04N 5/04 | (2006.01) |
| H04N 5/067 | (2006.01) |
| H04N 5/44 | (2011.01) |
| H04N 21/43 | (2011.01) |
| H04N 21/4363 | (2011.01) |
| H04N 5/60 | (2006.01) |
| H04R 25/00 | (2006.01) |

(52) U.S. Cl.
CPC .............. *H04N 5/067* (2013.01); *H04N 5/44* (2013.01); *H04N 5/602* (2013.01); *H04N 21/4307* (2013.01); *H04N 21/43637* (2013.01); H04R 25/00 (2013.01)

(58) Field of Classification Search
CPC ............ H04R 2225/61; H04R 2225/55; H04R 2499/15; H04R 25/50; H04R 25/505; H04N 21/2368; H04N 21/4341; H04N 5/04

USPC ......................................................... 348/515
See application file for complete search history.

(56) References Cited

U.S. PATENT DOCUMENTS

| | | | |
|---|---|---|---|
| 4,313,135 A | 1/1982 | Cooper | |
| 5,430,485 A | 7/1995 | Lankford | |
| 5,467,139 A | 11/1995 | Lankford et al. | |
| 7,212,247 B2* | 5/2007 | Albean ................. | G11B 27/10 348/423.1 |
| 8,995,688 B1* | 3/2015 | Chemtob et al. ........... | 381/109 |
| 2004/0090555 A1* | 5/2004 | Megeid ......................... | 348/515 |
| 2008/0181182 A1* | 7/2008 | Carichner et al. ........... | 370/336 |
| 2010/0220748 A1* | 9/2010 | Inomata ....................... | 370/503 |
| 2011/0138080 A1* | 6/2011 | Steiner et al. ............... | 709/248 |
| 2012/0013721 A1* | 1/2012 | Nishio ................... | H04R 25/00 348/61 |
| 2013/0070860 A1* | 3/2013 | Schramm .............. | H04J 3/0682 375/240.25 |
| 2013/0170654 A1* | 7/2013 | Ell et al. ...................... | 381/23.1 |
| 2013/0246551 A1* | 9/2013 | Park et al. .................... | 709/208 |
| 2014/0324422 A1* | 10/2014 | Winarski et al. ............ | 704/235 |
| 2015/0215496 A1* | 7/2015 | Matsuo .................... | H04N 5/04 348/515 |

* cited by examiner

*Primary Examiner* — Michael Lee
(74) *Attorney, Agent, or Firm* — Schwegman Lundberg & Woessner, P.A.

(57) ABSTRACT

Disclosed herein, among other things, are systems and methods for synchronizing audio and video signals for a listening system. One aspect of the present subject matter includes a method including receiving an audio signal and a video signal from an external device. The audio signal is processed and transmitted to a hearing assistance device having a wearer. In various embodiments, the video signal is transmitted to a video display using a delay such that the audio signal and the video signal are synchronized for the wearer.

20 Claims, 2 Drawing Sheets

US 10,178,281 B2

SYSTEM AND METHOD FOR SYNCHRONIZING AUDIO AND VIDEO SIGNALS FOR A LISTENING SYSTEM

TECHNICAL FIELD

This document relates generally to hearing assistance systems and more particularly to systems and methods for synchronizing audio and video signals for a listening system.

BACKGROUND

Modern hearing assistance devices, such as hearing aids, typically include digital electronics to enhance the wearer's listening experience. Hearing aids are electronic instruments worn in or around the ear that compensate for hearing losses by specially amplifying sound. Hearing aids use transducer and electro-mechanical components which are connected via wires to the hearing aid circuitry.

Hearing assistance devices, or listening devices, include the capability to receive audio from a variety of sources. For example, a hearing assistance device may receive audio or data from a transmitter or an assistive listening device (ALD). Audio information can be digitized, packetized and transferred as digital packets to and from the hearing instruments for the purpose of streaming entertainment or other content. Some listening systems use a device to wirelessly transmit an audio signal from a television to the hearing aid. For this wireless transmission, the device encodes the audio signal and transmits the signal. Then the hearing aid receives the signal, decode the signal, and convert the signal into an audio signal for the listener. This processing introduces delay in the audio stream causing the audio signal to be delayed relative to the video signal.

Accordingly, there is a need in the art for improved systems and methods for processing audio and video signals for a listening system.

SUMMARY

Disclosed herein, among other things, are systems and methods for synchronizing audio and video signals for a listening system. One aspect of the present subject matter includes a method including receiving an audio signal and a video signal from an external device. The audio signal is processed and transmitted to a hearing assistance device having a wearer. In various embodiments, the video signal is transmitted to a video display using a delay such that the audio signal and the video signal are synchronized for the wearer.

One aspect of the present subject matter includes a streaming device including a wireless input configured to receive an audio signal and a video signal from an external device. The device also includes a processor configured to process and transmit the audio signal to a hearing assistance device having a wearer. In various embodiments, the device is configured to transmit the video signal to a video display using a delay such that the audio signal and the video signal are synchronized for the wearer.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
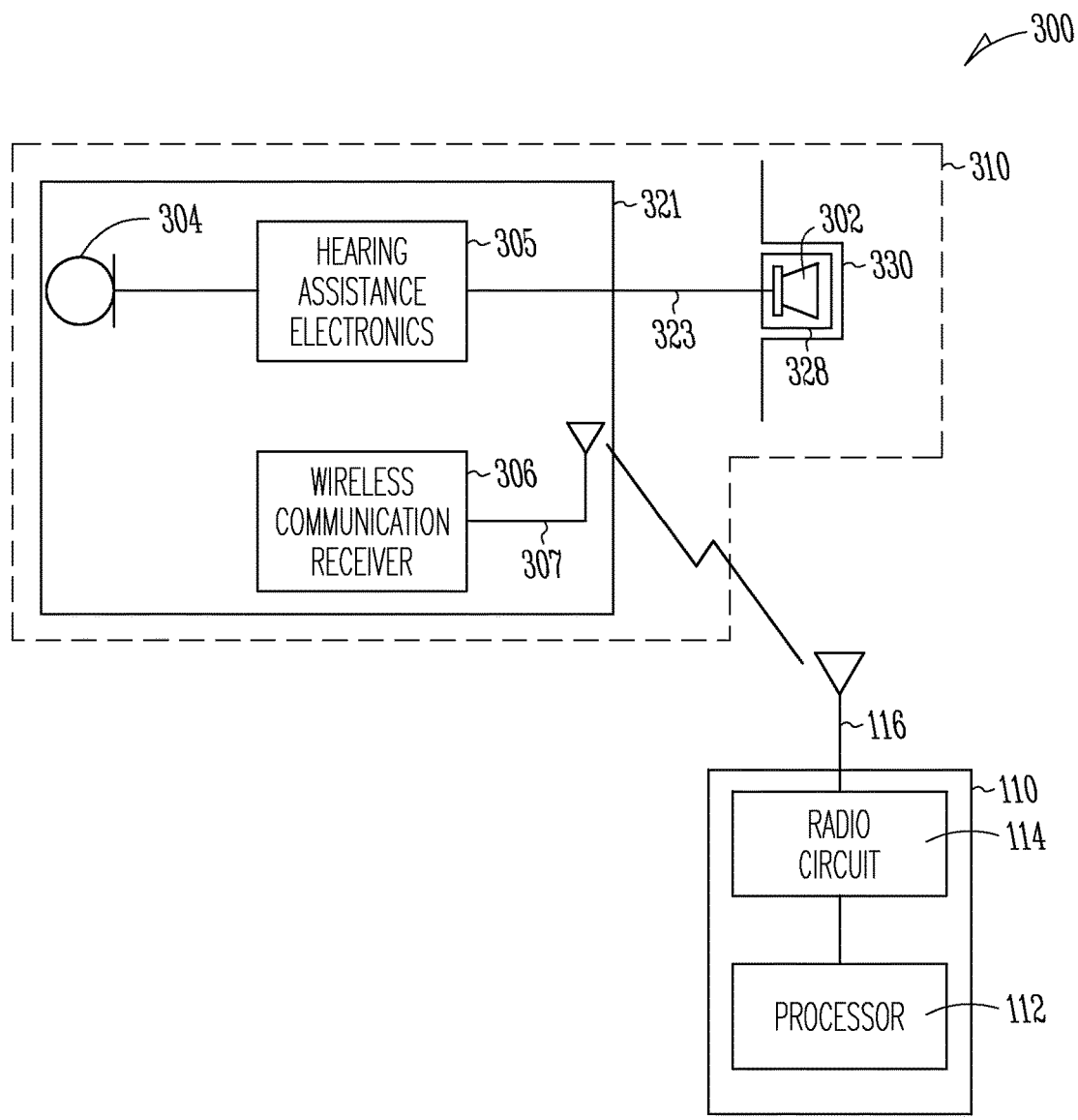
FIG. 1 illustrates a block diagram of a system including a hearing assistance device adapted to be worn by a wearer and an external device, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices, or listening devices, using the example of hearing aids. Hearing aids are only one type of hearing assistance device. Other hearing assistance devices include, but are not limited to, those in this document. It is understood that their use in the description is intended to demonstrate the present subject matter, but not in a limited or exclusive or exhaustive sense.

Many listening systems such as hearing aid systems use a device to wirelessly transmit the audio signal from a television to the listening device. For this wireless transmission, the device encodes the audio signal and transmits the signal. Then the listening device receives the signal, decodes the signal, and converts the signal into an audio signal for the listener. This processing introduces delay in the audio stream causing the audio signal to be delayed relative to the video signal. EIA standards RS-250-B limit the time differential between associated audio and video signals to 25 ms. lead or 40 ms. lag time. Film standards limit the time differential of associated audio and video to ±½ frame, which corresponds to 20.8 ms. In order to maintain the audio signal delay below these levels and to minimize the delay of the audio signal, a method for determining the audio delay is employed along with the introduction of a video signal delay in order to synchronize the audio and video signals in various embodiments.

Additionally, resolving the audio/video delay issue for users of listening devices creates a similar issue for people viewing the same program who are not using a listening device. Specifically, delaying the video signal causes the audio signal from the television to be advanced relative to the video display signal. To resolve this issue, the audio signal sent to the television is also delayed to match the video signal delay.

One approach that has been previously used is to keep the wireless transmission and audio path processing delays as short as possible in order to minimize the effect of the audio/video delay. However, this does not address the inherent delay in the wireless link and cannot resynchronize the audio and video signals. The present device and method synchronizes the audio signal and video display signal such that listening device users experience synchronized audio and video. Additionally, people who are viewing the same video signal without listening devices still have synchronized audio and video signals, in various embodiments.

Disclosed herein, among other things, are systems and methods for synchronizing audio and video signals for a listening system. One aspect of the present subject matter includes a method including receiving an audio signal and a video signal from an external device. The audio signal is processed and transmitted to a hearing assistance device having a wearer. In various embodiments, the video signal is transmitted to a video display using a delay such that the audio signal and the video signal are synchronized for the wearer.

In various embodiments, rather than simply sampling the audio signal from an audio video signal and transmitting that audio signal to listening device users, the device samples both the audio and video signal and delays the video signal to the video display by an amount appropriate to synchronize the audio and video for listening device users. Various methods can be used for audio/video synchronization. Specifically one method includes using a predetermined delay based on system design knowledge of the delay in the audio path from the input to the device through the listening device. Another method includes measuring the time between transmission of the audio signal to the listening device and the receipt of an acknowledgement signal from the listening device. Then the appropriate video delay time can be determined based on the round-trip audio signal to acknowledgment time. Another method includes synchronizing clocks between the device and the listening device. Then an audio signal can be assigned a time stamp upon transmission to the listening device. The listening device can determine the appropriate delay and transmit that to the device or the listening device can send an acknowledgement signal to the device and the device determines the appropriate video delay time.

The present subject matter provides a number of advantages. It provides a synchronized audio and video signal for listening device users rather than minimizing the effect of audio delay relative to the video signal. It also provides a mechanism where both listening device users and others not using listening devices can experience synchronized audio and video simultaneously. This is of great value because many hearing aid patients desire to watch television with the assistance of a device for streaming the television audio signal to the hearing aid via wireless radio frequency transmission. The present subject matter greatly enhances that experience by synchronizing the audio and video signals for the hearing aid patient and still allows others to watch and listen to the television without audio video delay issues, since the audio played through the hearing aid is synchronized to the audio from the television.

FIG. 1 illustrates a block diagram of a system 300, according to the present subject matter. The illustrated system 300 shows an external device 110 in wireless communication with a hearing assistance device 310. In various embodiments, the hearing assistance device 310 includes a first housing 321, an acoustic receiver or speaker 302, positioned in or about the ear canal 330 of a wearer and conductors 323 coupling the receiver 302 to the first housing 321 and the electronics enclosed therein. The electronics enclosed in the first housing 321 includes a microphone 304, hearing assistance electronics 305, a wireless communication receiver 306 and an antenna 307. In various embodiments, the hearing assistance electronics 305 includes at least one processor and memory components. The memory components store program instructions for the at least one processor. The program instructions include functions allowing the processor and other components to process audio received by the microphone 304 and transmit processed audio signals to the speaker 302. The speaker emits the processed audio signal as sound in the user's ear canal. In various embodiments, the hearing assistance electronics includes functionality to amplify, filter, limit, condition or a combination thereof, the sounds received using the microphone 304.

In the illustrated embodiment of FIG. 1, the wireless communications receiver 306 is connected to the hearing assistance electronics 305 and the conductors 323 connect the hearing assistance electronics 305 and the speaker 302. In various embodiments, the external device 110 includes a streaming audio device such as an ALD. The external device 110 includes an antenna 116 connected to a radio circuit 114 that include a transmitter, in an embodiment. In various embodiments, the external device 110 includes one or more processors 112 or processing components.

Figure 2:
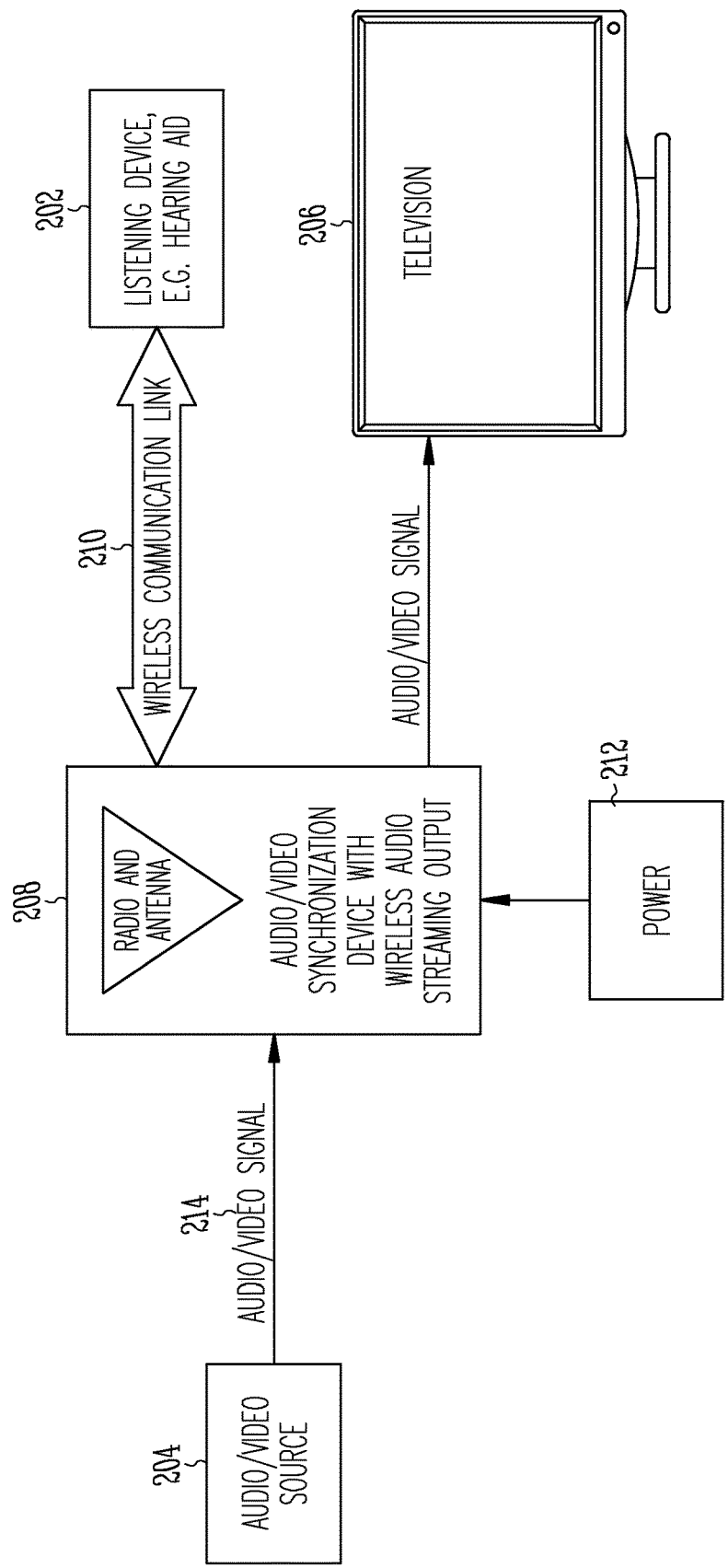
FIG. 2 illustrates a block diagram of a listening system for synchronizing audio and video signals for a hearing assistance device wearer, according to various embodiments of the present subject matter.

The present device and method for audio video synchronization provides synchronized audio and video signals for a listening device, e.g. hearing aid, user as well as for others not using a listening device but viewing the same video. An embodiment of the overall system is shown in FIG. 2. A source 204 of audio/video signal normally provides an audio/video input signal 214 to a television 206. In current audio streaming devices for use with a listening device 202, the audio portion of the signal is also input into an audio streaming device. The audio streaming device then converts the audio signal into a wireless radio frequency signal and broadcasts that signal to a listening device. In order to achieve the wireless broadcast of an audio signal, the audio signal is encoded, transmitted over the wireless link 210, and decoded by the listening device. That process introduces a delay in the audio signal delivered by the listening device to the user relative to the video signal. In the present subject matter, an audio/video synchronization device 208 is inserted into the audio/video signal path between the source 204 and television 206. Unlike current audio streaming devices, this device 208 takes as input both the audio and video parts of the input signal 214. The video signal is delayed before being output 216 to the television 206 by an amount equal to the delay in the audio broadcast path to the listening device 202, in an embodiment. In that way, the user of the listening device 202 experiences synchronized audio and video. Furthermore, the audio signal output to the television 206 by the audio/video synchronization device 208 is delayed by the same amount such that the audio and video output from the television remain synchronized for television viewers not using a listening device. According to various embodiments, the audio/video synchronization device 208 includes radio circuitry and an antenna 218 and is powered by an external power supply 212. Other embodiments of the audio/video synchronization device 208 include an internal power supply.

In various embodiments, the appropriate amount of delay to insert in the video signal path can be determined by a variety of methods. One method is to use a fixed delay that is predetermined based on the design of the audio streaming and listening system. This method involves a simple buffering of the video signal for a fixed length of time. Another method is to determine the round-trip time for transmission of a wireless signal from the audio streaming device to the listening system and then from the listening system back to the audio streaming system. This amount of delay inserted into the video signal path can be one-half of that round-trip signal delay or another amount based on that time, in an embodiment. Another method for determining the amount of delay to insert in the video signal path is to synchronize the clocks in both the audio/video synchronization device and the listening device using a method such as network clock synchronization based on IEEE 1588. In this method, the audio/video synchronization device sends a message to the listening device with a time stamp as part of the message. The listening device then determines the appropriate amount of delay by comparing the time stamp in the message to the current time based on its local clock. This delay is then broadcast back to the audio/video synchronization device where the delay is inserted into the video signal path. Alternate embodiments include additional methods to determine the appropriate amount of delay to insert in the video path, without departing from the scope of the present subject matter.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising
receiving an audio signal and a video signal from an external device synchronized to a network clock signal;
processing the audio signal and converting the audio signal into a wireless signal and transmitting the wireless signal to a hearing assistance device having a wearer;
transmitting the video signal to a video display using a delay based on a round-trip wireless signal delay between the external device and the hearing assistance device using a received acknowledgement from the hearing assistance device, such that the wireless signal and the video signal are synchronized for the wearer and synchronized to the network clock signal; and delaying the audio signal to the video display using the delay to synchronize the audio signal and video signal to the display.

2. The method of claim 1, wherein using a delay includes using a predetermined delay based on the audio path to and through the hearing assistance device.

3. The method of claim 1, wherein using a delay includes calculating the delay by measuring time between transmission of the audio signal to the hearing assistance device and receipt of an acknowledgement from the hearing assistance device.

4. The method of claim 1, wherein using a delay includes synchronizing clocks with the hearing assistance device.

5. The method of claim 4, comprising assigning a time stamp upon transmission of the audio signal to the hearing assistance device and calculating the delay based on receipt of an acknowledgment from the hearing assistance device.

6. The method of claim 4, wherein synchronizing clocks includes using network clock synchronization based on IEEE 1588.

7. The method of claim 1, comprising transmitting the video signal to the video display such that the audio signal and the video signal are synchronized for all viewers of the video display.

8. The method of claim 1, wherein processing the audio signal includes encoding the audio signal over a first time period.

9. The method of claim 8, wherein the hearing assistance device in configured to decode the audio signal over a second time period.

10. The method of claim 9, wherein the delay is calculated using the first time, the second time, and a transmission time.

11. A streaming device, comprising
a wireless input configured to receive an audio signal and a video signal from an external device;
a processor configured to:
process the audio signal and convert the audio signal into a wireless signal and transmit the wireless signal to a hearing assistance device having a wearer;
transmit the video signal to a video display using a delay based on a round-tri wireless signal delay between the external device and the hearing assistance device using a received acknowledgement from the hearing assistance device, such that the wireless signal and the video signal are synchronized for the wearer, wherein the delay is calculated using network clock synchronization to synchronize clocks with the external device; and
delay the audio signal to the video display using the delay to synchronize the audio signal and video signal to the display.

12. The device of claim 11, wherein the streaming device is an assistive listening device (ALD).

13. The device of claim 11, wherein the video display includes a television.

14. The device of claim 11, wherein the hearing assistance device includes a hearing aid.

15. The device of claim 14, wherein the hearing aid includes an in-the-ear (ITE) hearing aid.

16. The device of claim 14, wherein the hearing aid includes a behind-the-ear (BTE) hearing aid.

17. The device of claim 14, wherein the hearing aid includes an in-the-canal (ITC) hearing aid.

18. The device of claim 14, wherein the hearing aid includes a receiver-in-canal (RIC) hearing aid.

19. The device of claim 14, wherein the hearing aid includes a completely-in-the-canal (CIC) hearing aid.

20. The device of claim 14, wherein the hearing aid includes a receiver-in-the-ear (RITE) hearing aid.

* * * * *